Feb. 19, 1952     E. G. STOLTZ, SR     2,586,735

BACKWATER VALVE FOR DRAINS

Filed Oct. 31, 1949

INVENTOR
EDMUND G. STOLTZ SR.

BY *John H. Cassidy*

ATTORNEY

Patented Feb. 19, 1952

2,586,735

UNITED STATES PATENT OFFICE 2,586,735

BACKWATER VALVE FOR DRAINS

Edmund G. Stoltz, Sr., Granite City, Ill.

Application October 31, 1949, Serial No. 124,673

2 Claims. (Cl. 182—25)

This invention relates to a valve for drains, such as a floor drain, and is adapted to be used to prevent back water or flood water in a sewer pipe or drain pipe from backing up and flooding the area served by the drain.

While the invention is defined in the appended claims, a summary statement will assist in understanding the claims and the following detailed description of a preferred embodiment of the invention. Since, however, a part of the invention may be used without the whole, this summary is not to be construed as limiting the invention beyond that defined in the claims.

The valve includes a tubular supporting member adapted to be inserted in and communicating at its bottom with a drain pipe. A boss is fixed centrally within said tubular member by a webbing or ribs integral with and connecting the boss and the tubular member. A plate is adapted to engage a seat at the top of the tubular member and thereby close the member. A stud, fixed to the plate and extending downwardly therefrom, is threaded in the boss, whereby the tubular member may be opened and closed by turning the plate. A removable annular strainer may be supported between the boss and the tubular members by resting upon the webbing or ribs.

In order to protect the threads of the boss and the stud from dirt and to provide a retainer for lubricant, a housing is provided which includes a tubular wall or cup extending upwardly from the boss and a tubular sleeve extending downwardly from the plate in telescopic engagement with the said tubular wall or cup.

The invention may be better understood from the following detailed description of a preferred embodiment taken with the accompanying drawings.

Figure 1:
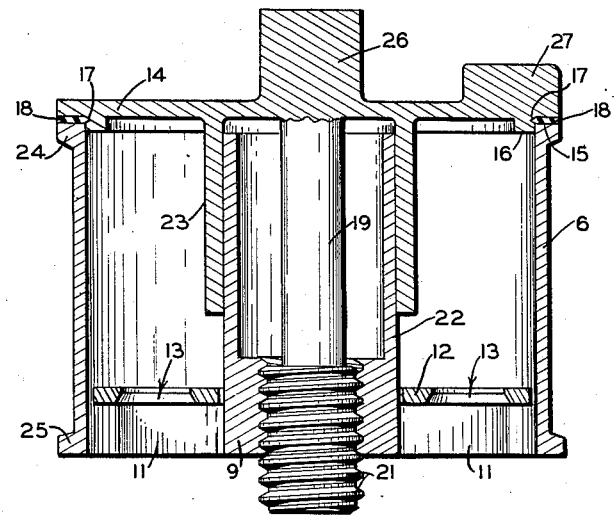
Figure 2:
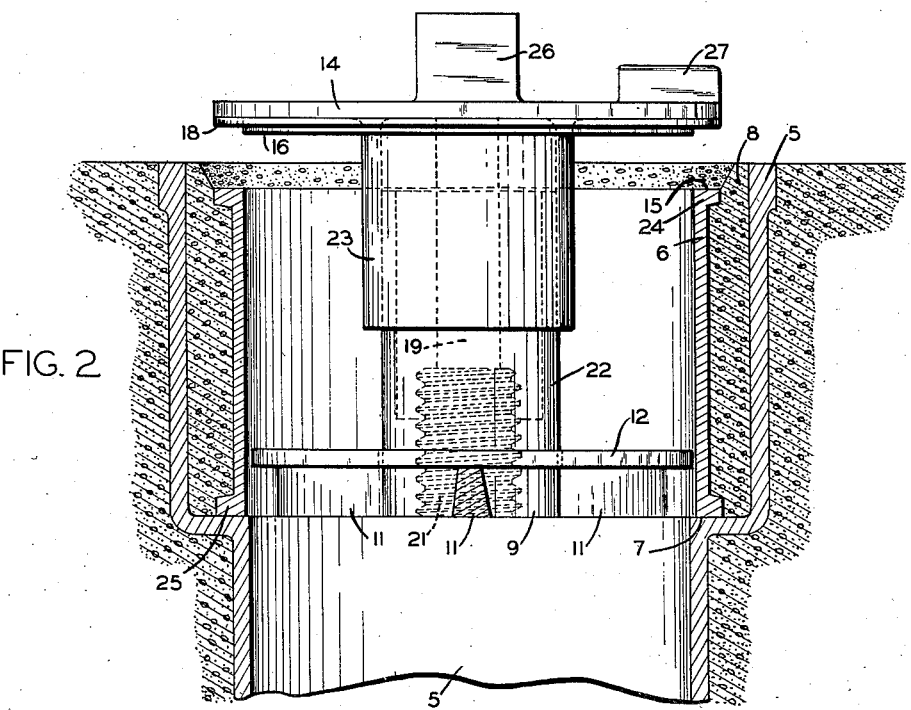

Fig. 1 is a vertical section through the valve with the valve in closed position; and Fig. 2 is a vertical section showing the valve installed in a drain with the valve in open position.

The valve is adapted to be installed in the bell or flanged upper end portion of a customary sewer pipe or drain pipe 5. It includes a tubular or cylindrical supporting member 6 which, as specifically shown, may be installed with its lower end resting upon a shoulder 7 of the drain pipe. The tubular member 6 is surrounded by packing material 8, between the outer surface of the cylindrical member 6 and the inner surface of the sewer pipe 5. This packing material may be of concrete, as shown, or may be of any convenient packing or caulking material which is such as will provide a water tight fit and hold the valve in position.

A boss 9 is fixed centrally within the tubular member 6 and is supported by ribs 11, which extend between the outer surface of the boss 9 and the inner surface of the tubular member 6.

The connection between the boss and the tubular member may be any type of webbing but a minimum of ribs is preferable, since this leaves sufficient space to insert a clean-out cable if desired. To provide a strainer, an annular plate 12 having holes 13, rests upon the ribs 11 and loosely fits within the tubular member and about the boss.

A closure plate 14 is adapted to engage a seat at the top of the tubular member 6. As specifically shown, the top surface 15 of the tubular member 6 is finished in a plane flange to form the seat. An annular ring 16 extends downwardly from the plate 14 and has a circumferential groove 17 to hold the inner edge of a gasket 18, carried on the bottom of the plate 14 and adapted to form a seal with the top surface or seat 15 on the tubular member 6.

A stud 19 is integral with and extends downwardly from the plate 14 and has threads 21 on its lower end adapted to engage internal threads in the boss 9. Thus, it will be seen that, by turning the plate, it will be caused to open and close against the seat 15. In order to protect the threads of the stud and the boss against dirt and to form a lubricant retainer, a housing is provided for the stud. This housing includes a tubular cylindrical member or cup 22 integral with the boss and extending upwardly therefrom, and a cylindrical sleeve 23 extending downwardly from and integral with the plate 14 and in telescopic engagement with the cup 22.

The valve assembly, therefore, really includes three integral members: the tubular supporting member with its appurtenances; a closure plate 14 with its appurtenances; and the annular strainer 12.

The tubular member has preferably, at its top and bottom, annular flanges 24 and 25, respectively. This tubular member 6, with its flanges 24 and 25, the webbing or ribs 11, the boss 9 and cylindrical cup 22, may be cast integrally and later, of course, subjected to necessary machining.

In order to provide convenient means for turning the plate 14 a central nut or lug 26 is provided on the top of the plate, as well as a wing lug 27. The plate member 14, with its appurtenances, nut or lug 26, wing lug 27, stud 19 and sleeve 23, may be cast integrally.

The operation of the device may be obvious from the foregoing description. The valve may be placed and secured within the bell end of a customary sewer drain pipe. As specifically shown, the top of the valve is substantially level with the floor to be drained. It may, however, be set in a drain pipe so that the top of the assembly is below the level of the floor, in which case a strainer plate may be placed over the entire structure. Its mode of connection with the drain pipe may be varied.

For ordinary use, the valve will remain open as shown in Fig. 2 and may be closed upon threatened flood conditions so as to stop the flow of any back water. The ribs 11, as when three are employed, leave substantial spaces between them for the entrance of a cable tool for cleaning out the drain pipe. These ribs provide a rest for the annular strainer plate 12, which is loose fitting so that it may be easily removed.

While there has been shown a square nut or lug 26 and a wing lug 27 by which the plate may be rotated, it will be obvious that other convenient means may be employed which will give a connection with a wrench or other tool to turn the closure plate 14 into and out of sealing engagement with the tubular member.

Various changes, some of which have been suggested, may be made within the scope of the appended claims without departing from the spirit of this invention. Parts of the invention may be used without the whole and additions and improvements may be added while retaining the benefits of the invention.

I claim:

1. A back water valve for drains, comprising a tubular suppporting member adapted to communicate at its bottom with a drain pipe, a boss fixed centrally within said tubular member, a plate adapted to engage a seat at the top of the tubular member and thereby close said member, a stud fixed to said plate and threaded in the boss, whereby the tubular member may be opened and closed by turning the plate, and a housing for the stud including a tubular wall extending upwardly from the boss and a tubular sleeve extending downwardly from the plate in telescopic engagement with said tubular wall.

2. A back water valve for drains, comprising a tubular supporting member adapted to communicate at its bottom with a drain pipe, a boss fixed centrally within said tubular member, a plate adapted to engage a seat at the top of the tubular member and thereby close said member, a stud fixed to said plate and threaded in the boss, whereby the tubular member may be opened and closed by turning the plate, a cylindrical cup integral with and extending upwardly from the boss to form the bottom of a lubricant retainer, and a cylindrical sleeve extending downwardly from the plate about the stud and in telescopic engagement therewith.

EDMUND G. STOLTZ, Sr.

REFERENCES CITED

The following references are of record in the file of this patent:

UNITED STATES PATENTS

| Number | Name | Date |
| --- | --- | --- |
| 142,438 | Chapman | Sept. 2, 1873 |
| 1,190,841 | Almasy et al. | July 11, 1916 |
| 1,211,283 | Butler | Jan. 2, 1917 |
| 1,674,074 | Turner | June 19, 1928 |
| 1,875,857 | Cruff et al. | Sept. 6, 1932 |
| 2,174,332 | Schweighart | Sept. 26, 1939 |